United States Patent
Kikuchi et al.

(10) Patent No.: US 11,105,926 B2
(45) Date of Patent: Aug. 31, 2021

(54) PHASE DIFFERENCE FREQUENCY GENERATING METHOD, PHASE DIFFERENCE FREQUENCY GENERATING DEVICE AND ELECTRONIC DISTANCE METER

(71) Applicant: TOPCON Corporation, Tokyo-to (JP)

(72) Inventors: Masaho Kikuchi, Tokyo-to (JP); Naoki Shoji, Tokyo-to (JP); Masae Matsumoto, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 636 days.

(21) Appl. No.: 16/000,261

(22) Filed: Jun. 5, 2018

(65) Prior Publication Data

US 2018/0356522 A1    Dec. 13, 2018

(30) Foreign Application Priority Data

Jun. 8, 2017 (JP) .............................. JP2017-113247

(51) Int. Cl.
| | |
|---|---|
| *G01S 17/36* | (2006.01) |
| *G01B 9/02* | (2006.01) |
| *G01S 7/4915* | (2020.01) |
| *G01S 7/4911* | (2020.01) |

(52) U.S. Cl.
CPC .......... *G01S 17/36* (2013.01); *G01B 9/02004* (2013.01); *G01S 7/4911* (2013.01); *G01S 7/4915* (2013.01)

(58) Field of Classification Search
CPC ...................................................... G01S 17/36
See application file for complete search history.

(56) References Cited

U.S. PATENT DOCUMENTS 5,889,490 A * 3/1999 Wachter .................. G01S 17/10
342/127
2016/0259039 A1* 9/2016 Ohtomo ................ G01S 7/4865

FOREIGN PATENT DOCUMENTS

| JP | 2011-185707 A | 9/2011 |
| JP | 2016-161411 A | 9/2016 |

* cited by examiner

*Primary Examiner* — Luke D Ratcliffe
(74) *Attorney, Agent, or Firm* — Nields, Lemack & Frame, LLC (57) ABSTRACT

A phase difference frequency generating method comprising: cutting out a reference signal, which is a continuous signal with a predetermined frequency, in a predetermined time and at a predetermined time interval by a signal for intermitting and creating a first intermittent signal, shifting the signal for intermitting by a time corresponding to $\pi/a$ (a=natural number) of a fundamental frequency of the reference signal, cutting out the reference signal in the predetermined time and at the predetermined time interval by the signal for intermitting as shifted and creating a second intermittent signal, and carrying out a restoration processing for restoring the second intermittent signal by a time as shifted.

4 Claims, 7 Drawing Sheets

(EQUATION 1)

$$DFTc(\omega) = A_c \frac{1}{T_B} \sin\frac{n\omega T_0}{2} \left[ \left\{ \frac{1}{\omega_0 + \omega} \cos(\alpha+\beta) - \frac{1}{\omega_0 - \omega} \cos(\alpha-\beta) \right\} + i \left\{ \frac{1}{\omega_0 + \omega} \sin(\alpha+\beta) + \frac{1}{\omega_0 - \omega} \sin(\alpha-\beta) \right\} \right]$$

PHASE DIFFERENCE FREQUENCY GENERATING METHOD, PHASE DIFFERENCE FREQUENCY GENERATING DEVICE AND ELECTRONIC DISTANCE METER

BACKGROUND OF THE INVENTION

The present invention relates to a phase difference frequency generating method, a phase difference frequency generating device and an electronic distance meter which enable to generate a frequency with a phase difference as desired with respect to a reference frequency.

In the electronic distance meter, a modulated frequency is generated, a light emitter is driven based on the modulated frequency, a modulated light is emitted as a distance measuring light, a reflected distance measuring light from an object to be measured is received, and a distance is measured based on a phase of the reflected distance measuring light.

Further, in a process of a signal processing, there is a case where a signal with a different phase is required, and in this case, a generator for generating a signal with the different phase was provided separately. For this reason, a circuit arrangement became complicated, and it became a factor for a cost increase.

Alternatively, in the process of the signal processing, there is a case where a signal with an inverted phase is used in order to eliminate a noise, and in this case, too, a generator for generating a signal with the inverted phase was provided separately. For this reason, the circuit arrangement became complicated, and it also became the factor for the cost increase.

SUMMARY OF THE INVENTION

It is an object of the present invention to provide a method and a device which enable to create a signal with a phase as desired without separately adding a generator in a case where a signal with a phase difference as desired with respect to a reference signal is to be generated.

To attain the object as described above, a phase difference frequency generating method according to the present invention comprises cutting out a reference signal, which is a continuous signal with a predetermined frequency, in a predetermined time and at a predetermined time interval by a signal for intermitting and creating a first intermittent signal, shifting the signal for intermitting by a time corresponding to $\pi/a$ (a=natural number) of a fundamental frequency of the reference signal, cutting out the reference signal in the predetermined time and at the predetermined time interval by the signal for intermitting as shifted and creating a second intermittent signal, and carrying out a restoration processing for restoring the second intermittent signal by a time as shifted.

Further, a phase difference frequency generating method in an electronic distance meter according to the present invention comprises cutting out a reference signal, which is a continuous signal with a predetermined frequency, in a predetermined time and at a predetermined time interval by a signal for intermitting and creating a first intermittent signal, shifting the signal for intermitting by a time corresponding to $\pi/a$ (a=natural number) of a fundamental frequency of the reference signal, cutting out the reference signal in the predetermined time and at the predetermined time interval by the signal for intermitting as shifted and creating a second intermittent signal, making a light emitter emit based on the first intermittent signal and the second intermittent signal, emitting a first intermittent distance measuring light and a second intermittent distance measuring light and receiving a reflected distance measuring light from an object to be measured by a photodetector, and carrying out a restoration processing for restoring, by a time as shifted, a second photodetection intermittent signal in a first intermittent photodetection signal and the second intermittent photodetection signal emitted from the photodetector.

Further, a phase difference frequency generating device according to the present invention comprises a reference signal generating module for generating a reference signal, which is a continuous signal with a predetermined frequency, a signal for intermitting generating module for generating a signal for intermitting, a phase shifter for generating an intermittent signal which is acquired by shifting the signal for intermitting by a time corresponding to $\pi/a$ (a=natural number) of a fundamental frequency of the reference signal, and a shift restoration module for carrying out a restoration processing of restoring a second intermittent signal, which is shifted by the time of $\pi/a$, by a time as shifted.

Furthermore, an electronic distance meter according to the present invention comprises a distance measuring light projecting module having a light emitter and for driving the light emitter and emitting a distance measuring light, a photodetection signal generating module having a photodetector for receiving a reflected light from an object to be measured and producing a photodetection signal, and an arithmetic control module for calculating a distance to the object to be measured based on the photodetection signal, wherein the distance measuring light projecting module includes a reference signal generating module for generating a reference signal, which is a continuous signal with a predetermined frequency, signal for intermitting generating modules for creating a signal for intermitting which cuts out the reference signal, which is the continuous signal with the predetermined frequency, in a predetermined time and at a predetermined time interval and creates an intermittent signal, phase shifters for shifting the signal for intermitting by a time corresponding to $\pi/a$ (a=natural number) of a fundamental frequency of the reference signal, and a light emission driving module for driving the light emitter based on the signal for intermitting and the signal for intermitting as shifted and emitting an intermittent distance measuring light and an intermittent distance measuring light as shifted, and wherein the photodetection signal generating module has a shift restoration module for carrying out a restoration processing of restoring, by a time as shifted, an intermittent reflected distance measuring light as shifted in a signal of an intermittent reflected distance measuring light produced by the photodetector and a signal of the intermittent reflected distance measuring light as shifted.

According to the present invention, the phase difference frequency generating method comprises cutting out a reference signal, which is a continuous signal with a predetermined frequency, in a predetermined time and at a predetermined time interval by a signal for intermitting and creating a first intermittent signal, shifting the signal for intermitting by a time corresponding to $\pi/a$ (a=natural number) of a fundamental frequency of the reference signal, cutting out the reference signal in the predetermined time and at the predetermined time interval by the signal for intermitting as shifted and creating a second intermittent signal, and carrying out a restoration processing for restoring the second intermittent signal by a time as shifted.

As a result, the signal with the phase as desired can be created without separately adding a generator.

DETAILED DESCRIPTION OF THE PREFERRED EMBODIMENT

A description will be given below on embodiments of the present invention by referring to the attached drawings.

First, in FIG. 1 to FIG. 3, a description will be given on a case where the present embodiment is applied to an electronic distance meter and a basic configuration of a phase difference frequency generating device 1 according to the present embodiment.

Reference numeral 2 denotes a reference signal generating module, and the reference signal generating module 2 generates a reference signal s1 which is a continuous signal with a predetermined frequency. Reference numeral 3 denotes a signal for intermitting generating module, and the signal for intermitting generating module 3 emits a signal for intermitting s2 which intermits the continuous signal at a predetermined time interval. Reference numeral 4 denotes a phase difference setting module, and the phase difference setting module 4 emits a phase difference setting signal s8 for setting a direction in which a phase difference can be shifted and an amount of the phase difference which can be shifted with respect to the reference signal. Reference numeral 5 denotes a phase shifter, and the phase shifter 5 calculates a shift time corresponding to the phase difference based on the phase difference setting signal s8 and based on a frequency of the reference signal s1 and the phase difference set by the phase difference setting signal s8. Further, the phase shifter 5 emits a signal for intermitting shifted by the shift time as set (hereinafter, a deviation signal for intermitting) s3 in a shift direction as set. Reference numeral 7 denotes a light emitter for emitting a distance measuring light, reference numerals 8a and 8b denote light emission driving modules for making the light emitter 7 emit in a state as required. It is to be noted that, as the light emitter, a laser diode and the like are used.

Further, reference numeral 11 denotes a photodetector, reference numeral 12 denotes a shift restoration module, and the shift restoration module 12 restores a time deviation of a signal in which a phase is changed. Reference numeral 13 denotes a signal processing module, and the signal processing module 13 carries out a signal processing as required such as an amplification, an A/D conversion and the like to a photodetection signal. It is to be noted that, as the photodetector, a photodiode or an avalanche photodiode (APD), and the like are used.

The reference signal s1 emitted from the reference signal generating module 2 is branched, and from one of branched signals of the reference signal s1, the reference signal s1 is cut out by the signal for intermitting s2 from the signal for intermitting generating module 3, and an intermittent signal (first burst signal) s4 is generated.

Further, the signal for intermitting s2 from the signal for intermitting generating module 3 is shifted by the phase shifter 5 in the shift direction as set with respect to the signal for intermitting (burst signal) s2 from the signal for intermitting generating module 3 and by the shift time as set. The signal for intermitting s2 as shifted becomes the deviation signal for intermitting (burst signal) s3.

From the other of the branched signals of the reference signal s1, the reference signal s1 is cut out by the deviation signal for intermitting s3, and an intermittent signal (second burst signal) s5 is generated. The second burst signal s5 has a phase of a waveform shifted by the shift time with respect to the first burst signal s4. Assuming that a cycle of 1 waveform of the reference signal s1 is T and assuming that the shift time is T/4, the second burst signal s5 has the phase of the waveform shifted by 90° with respect to the first burst signal s4.

Figure 2:
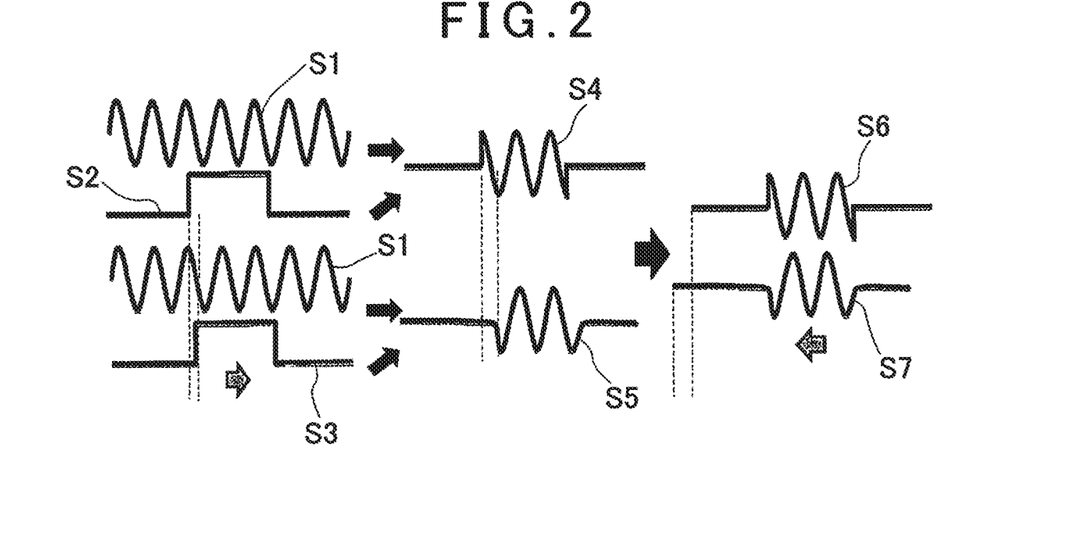
FIG. 2 is an explanatory drawing of a signal processing in the phase difference frequency generating device.
Figure 3:
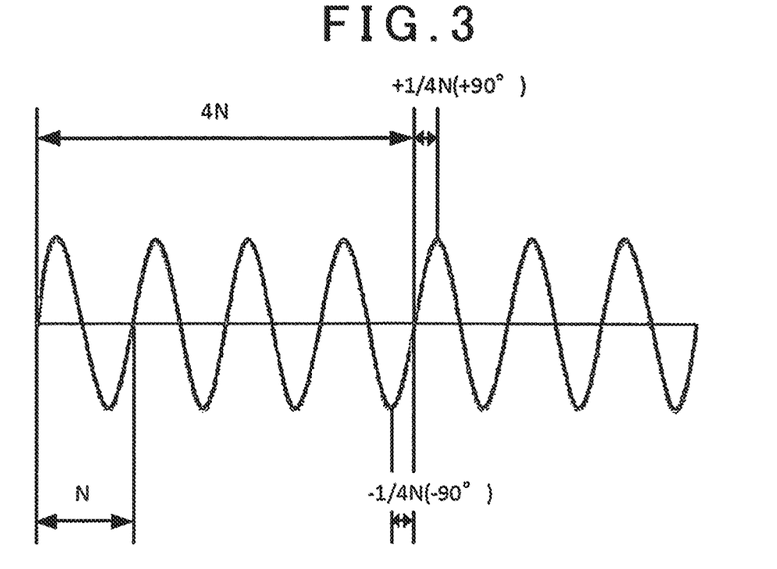
FIG. 3 is an explanatory drawing of shifting a phase.

Further, the second burst signal s5 itself is shifted by the shift time (T/4) with respect to the first burst signal s4 (delayed by the shift time in FIG. 2).

That is, the deviation intermittent signal (second burst signal) s5 having a phase shift as set and shifted by the time as set in the shift direction as set is generated.

The light emission driving modules 8a and 8b make the light emitter 7 emit (burst light emission) based on the intermittent signal s4 and the deviation intermittent signal s5. It is to be noted that a light emission by the light emission driving modules 8a and 8b is time-divided, and the light emitter 7 is alternately emitted by the light emission driving modules 8a and 8b.

FIG. 2 shows a relationship among the reference signal, the signal for intermitting and the intermittent signal.

The reference signal s1 is partially cut out by the signal for intermitting s2 and becomes the intermittent signal s4. Further, the intermittent signal s4 is a signal with a cosine waveform from a cut-out position of the signal for intermitting s2.

Further, the deviation signal for intermitting s3 is set as a signal delayed by $\pi/2$ of one cycle wave of the reference signal s1 with respect to the signal for intermitting s2. Therefore, the deviation signal for intermitting s3 cuts out the reference signal s1 at a position delayed by π/2 with respect to the signal for intermitting s2, and the deviation intermittent signal s5 is a signal with a −sine waveform.

The distance measuring light is reflected by an object to be measured and received by the photodetector 11, and the photodetection signal is emitted from the photodetector 11. This photodetection signal includes an intermittent photodetection signal s6 with a cosine waveform corresponding to the intermittent signal s4 and a deviation intermittent photodetection signal s7 with a −sine waveform corresponding to the deviation intermittent signal s5 and with a time delay by π/2 with respect to the intermittent photodetection signal s6.

The deviation intermittent photodetection signal s7 is input to the shift restoration module 12. The deviation signal for intermitting s3 from the phase shifter 5 is input to the shift restoration module 12. The shift restoration module 12 carries out a signal processing (restoration processing) for advancing the deviation intermittent photodetection signal s7, which is delayed by the time of π/2 (that is, the shift time), by the shift time based on the deviation signal for intermitting s3.

It is to be noted that, in the signal processing in the shift restoration module 12, in a case where the deviation intermittent photodetection signal s7 is shifted in an advancing direction in terms of time by the deviation signal for intermitting s3, the restoration processing becomes a processing in which the deviation intermittent photodetection signal s7 is delayed by a shift time as shifted. That is, in the restoration processing, a restoration is carried out by the time as shifted.

By the restoration processing of the deviation intermittent photodetection signal s7, the intermittent photodetection signal s6 with the cosine waveform and the deviation intermittent photodetection signal s7 with the −sine waveform are input to the signal processing module 13 in a state without a time delay.

Therefore, according to the present embodiment, a signal with a different phase can be generated only by adjusting a generation timing of the signal for intermitting, and there is no need to provide a signal generator for generating a signal with a phase difference.

Figure 1:
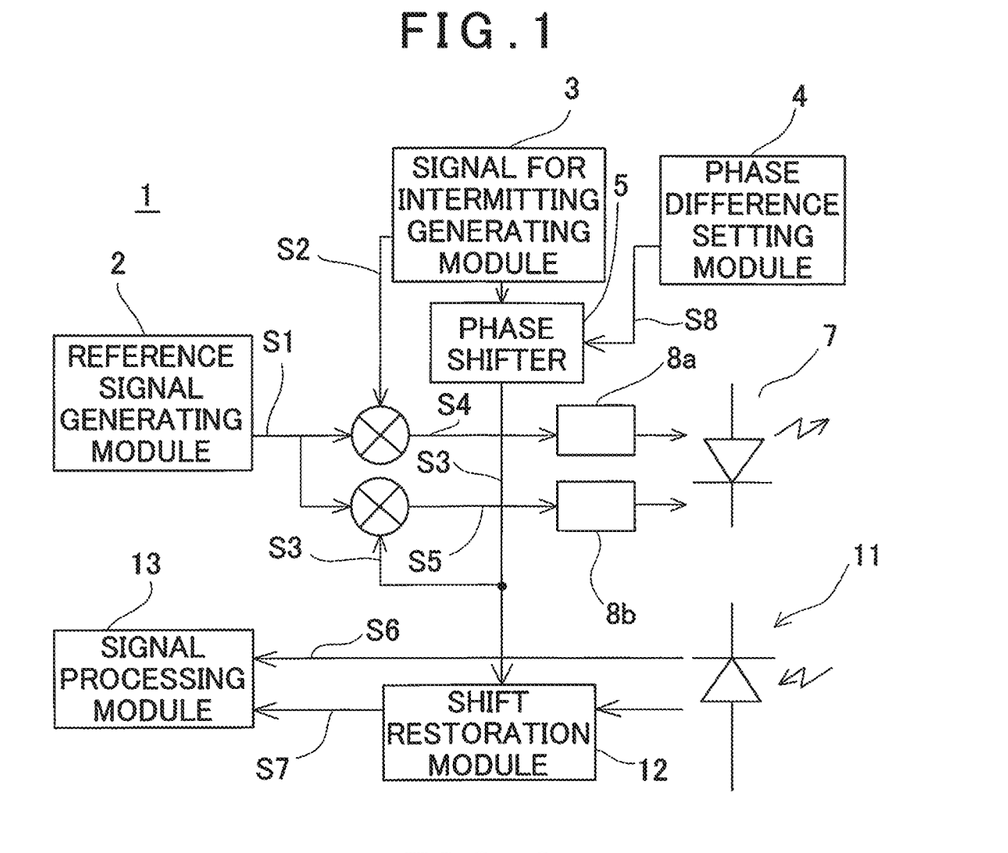
FIG. 1 is a schematical block diagram of a phase difference frequency generating device.

It is to be noted that, in the embodiment as described above, although the restoration processing is carried out regarding the photodetection signal, and the signal as input to the signal processing module is created to the signal with the different phase, it may be so configured that a function of the restoration processing is added to the light emission driving module 8b in FIG. 1, the restoration processing is carried out to the deviation intermittent signal s5 as output to the light emitter 7, and a signal with a different phase at the same timing is created.

Next, a description will be given on an action for creating the deviation signal for intermitting s3 by the phase difference setting module 4 and the phase shifter 5 by FIG. 3.

Assuming that reference character N denotes a fundamental frequency and the reference signal s1 has a frequency of 4N, a description will be given on a case where a frequency, which has a phase difference as required with respect to this reference signal s1, is generated. In the description as given below, in order to facilitate an explanation, the shift time is replaced by a phase.

First, in a case where a frequency, which has a phase shifted by π/2 (+90°) with respect to a reference frequency 4N (4N=F), is generated, a frequency, which starts from a point where π/2 of the fundamental frequency N is added to the reference frequency 4N, is extracted. That is, the cut-out position by the signal for intermitting is set at the point where π/2 of the fundamental frequency N is added to the reference frequency 4N.

In a case where a frequency is different or even in a case where the frequency is changed, since the phase is saved, by shifting π/2 phase of the fundamental frequency N to a + side, π/2 phase is also shifted to + with respect to the reference frequency 4N.

Next, in a case where a frequency, which has a phase shifted by −π/2 (−90°) with respect to the reference frequency 4N, is generated, a frequency, which starts from a point where π/2 of the fundamental frequency N is subtracted with respect to the reference frequency 4N, is extracted. That is, the cut-out position by the signal for intermitting is set at the point where π/2 of the fundamental frequency N is subtracted from the reference frequency 4N.

Similarly, by extracting the frequency starting from the point where π/2 of the fundamental frequency N is subtracted from the reference frequency 4N, π/2 phase is shifted to a − side also with respect to the reference frequency 4N.

A deviation of the phase is not limited to π/2, and the phase can be deviated by a desired amount of π/a (a=natural number) such as π/4, π/3, n and the like.

Here, assuming that one cycle of 1 cycle wave constituting the fundamental frequency is T (time), it results in π/2=T/4, π/4=T/8, π/3=T/6, n=T/2 time.

Next, a description will be given on a case where the present embodiment is applied to the electronic distance meter.

Recently, in the electronic distance meter, in order to ensure a photodetection amount, a light intensity is increased, but in order to make a duty of a light emission become less than a predetermined value, a burst light emission method is adopted in which a light is intermittently emitted (burst light emission).

An embodiment as described below also describes an outline configuration of the electronic distance meter adopting the burst light emission method.

Figure 4:
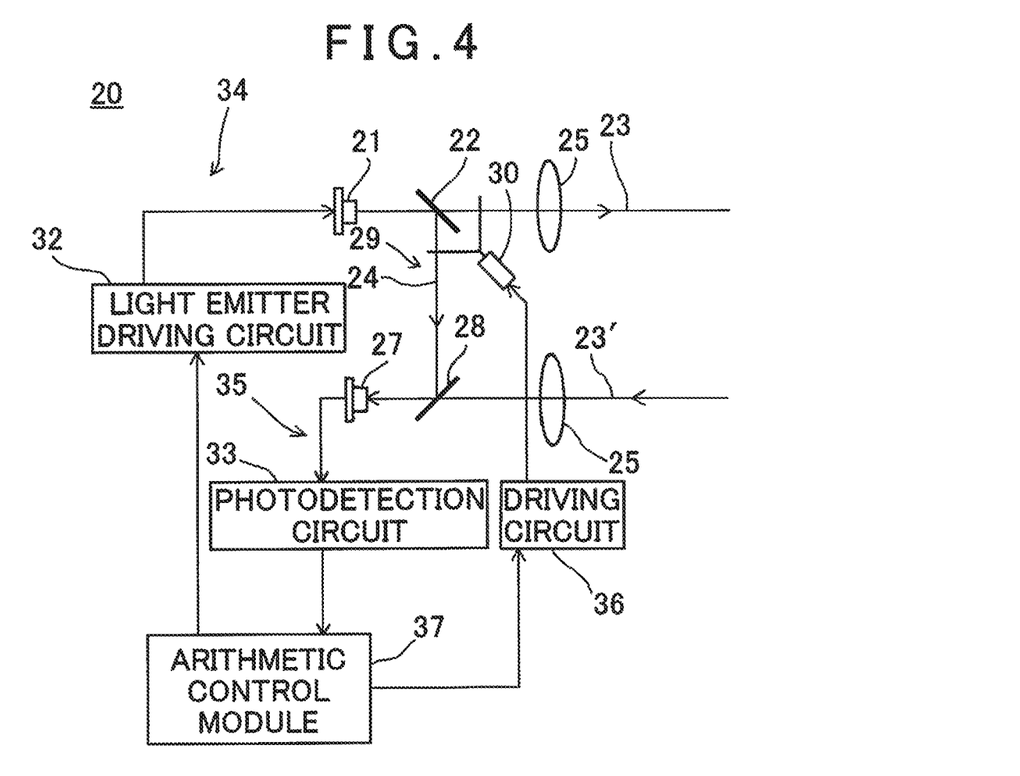
FIG. 4 is a conceptual diagram to show a basic configuration of an electronic distance measuring instrument.

First, a description will be given on a basic configuration of an electronic distance measuring instrument 20 in FIG. 4.

A light emitter 21 (a laser diode: LD, for instance) is driven by a light emitter driving circuit 32 and emits a laser beam of which an intensity is modulated to a predetermined frequency. The laser beam is divided by a half mirror 22 into a distance measuring light 23 and an internal reference light 24 by a predetermined ratio. The distance measuring light 23 as transmitted through the half mirror 22 is irradiated to an object to be measured (not shown) through an objective lens 25. A reflected distance measuring light 23' as reflected by the object to be measured is received by a photodetector 27 through the objective lens 25 and a half mirror 28. It is to be noted that, as the photodetector, a photodiode or an avalanche photodiode (APD) is used, for instance.

The light emitter 21, the light emitter driving circuit 32 and the like make up a distance measuring light projecting module 34, and the photodetector 27, a photodetection circuit 33 and the like make up a photodetection signal generating module 35.

The internal reference light 24 reflected by the half mirror 22 is reflected by the half mirror 28 on an optical path of the reflected distance measuring light 23' and is received by the photodetector 27. An optical path from the half mirror 22 to the photodetector 27 makes up an internal reference optical path 29 and has a known optical path length.

An optical path switching module 30 is provided across an optical path of the distance measuring light 23 and the internal reference optical path 29. The optical path switching module 30 switches the optical path (that is, selects the distance measuring light 23 or the internal reference optical path 29) based on a signal from a driving circuit 36, and the reflected distance measuring light 23' and the internal reference light 24 are alternately received by the photodetector 27. The photodetection signal of the photodetector 27 is input to the photodetection circuit 33. As the optical path switching module 30, a shutter for physically switching an optical path may be used, or a liquid crystal for electronically switching an optical path may be used.

Further, the optical path switching module 30 is means for enabling to separate and receive the internal reference light 24 and the distance measuring light 23 by the photodetector 27, and if an optical path adjusting component such as an optical fiber or the like is provided on an optical path of the internal reference light 24 so that a time difference is generated when the photodetector 27 receives the internal reference light and the distance measuring light, the optical path adjusting component has the same function as an optical path switching, and the optical path switching module 30 can be omitted.

The photodetection circuit 33 executes the signal processing as required such as amplification of the photodetection signal from the photodetector 27 by an amplifier, a frequency conversion (beat down) by a mixer, the A/D conversion and the like and inputs a photodetection signal after being processed to an arithmetic control module 37.

The arithmetic control module 37 is a CPU, for instance, and as the arithmetic control module 37, a PC or the like may be used. The arithmetic control module 37 controls the light emitter driving circuit 32 and controls a light emitting state of the light emitter 21 via the light emitter driving circuit 32. Further, the arithmetic control module 37 controls the driving circuit 36 and switches between the reflected distance measuring light 23' and the internal reference light 24 which enter the photodetector 27.

Further, the arithmetic control module 37 obtains a phase difference (photodetection time difference) between the internal reference light 24 and the reflected distance measuring light 23' based on the photodetection signal and calculates a distance based on the photodetection time difference and a light velocity. Further, when the arithmetic control module 37 obtains the phase difference between the internal reference light 24 and the reflected distance measuring light 23', unstable factors on the circuit such as a drift of the photodetection circuit 33 and the like are removed.

Figure 5:
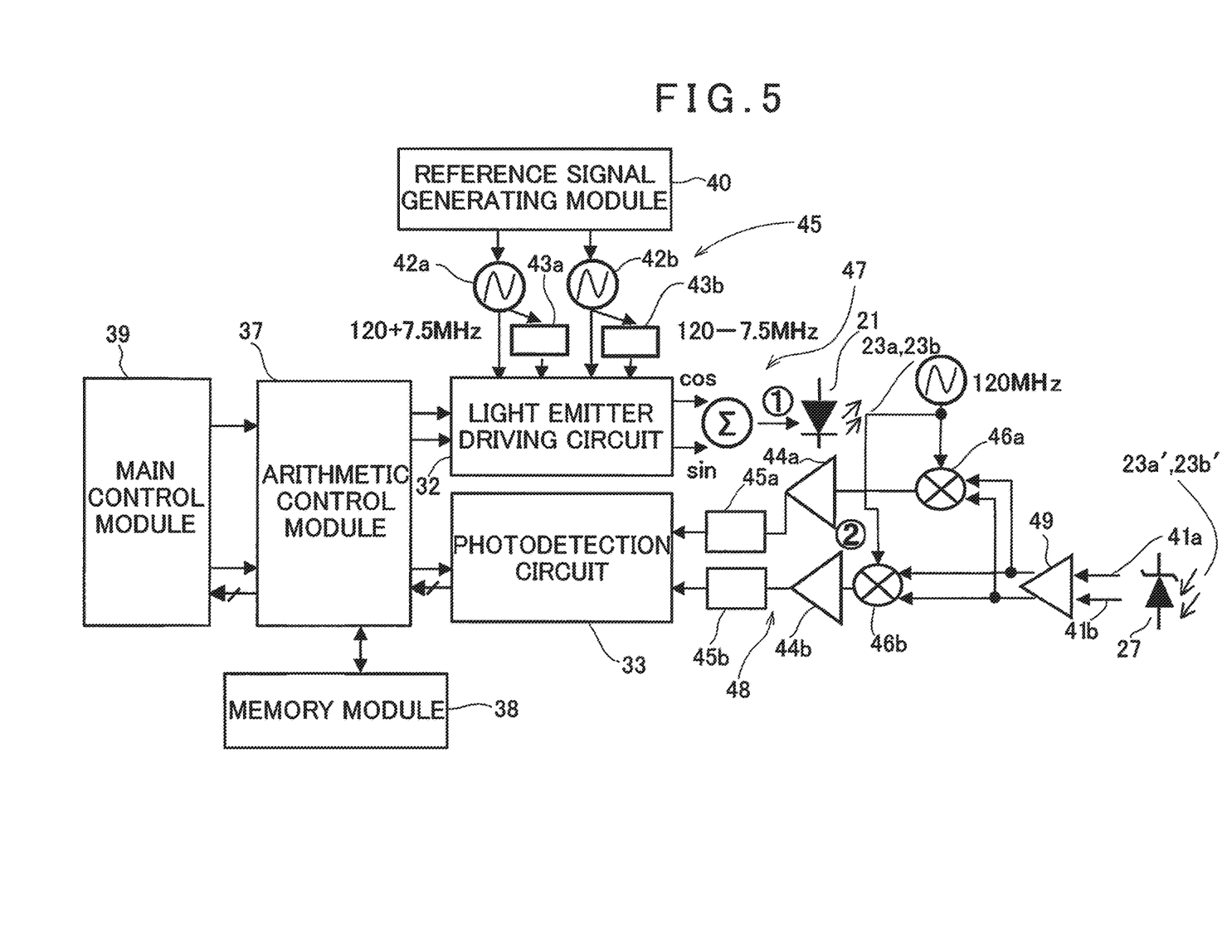
FIG. 5 is a schematical block diagram of a distance measuring component according to an embodiment of the present invention.

FIG. 5 shows a schematical block diagram of the distance measuring component according to the embodiment of the present invention. In FIG. 5, what are equivalent to components as shown in FIG. 4 are referred by the same symbol.

In FIG. 5, reference numeral 40 denotes a reference signal generating module and emits the reference signal s1 as predetermined. In the following description, 30 MHz as a reference frequency, 120 MHz as a modulated fundamental frequency, 7.5 MHz as a beat-down frequency (intermediate frequency), and 60 MHz as a sampling frequency of an analog-digital conversion are exemplified. It is to be noted that, as each of the frequencies, frequencies which are integral multiples of the sampling frequency in addition, such as 240 MHz and the like are used, and the reference frequency is adequately selected according to an accuracy and a capability required by the electronic distance meter.

With respect to the reference frequency emitted from the reference signal generating module 40, a divided frequency signal is generated. A modulated frequency is generated by a frequency, which is an integral multiple of the divided frequency signal and the reference frequency (120 MHz as the modulated fundamental frequency). It is to be noted that the divided frequency signal is acquired by dividing the modulated fundamental frequency by the integral multiple for a convenience of a calculation and further, since a divisor depends on an S/N ratio, approximately 8 to 20 are preferable. In the description as given below, the divisor is assumed to be 16, and the divided frequency signal of 7.5 MHz is generated.

Two modulation signals 120 MHz+7.5 MHz and 120 MHz−7.5 MHz having close frequencies are generated by modulated frequency generating modules 42a and 42b based on the reference signal from the reference signal generating module 40.

The modulation signal 120 MHz+7.5 MHz are input to the light emitter driving circuit 32. Further, another modulation signal 120 MHz+7.5 MHz, which is shifted by a phase shifter 43a by a time (T/4) corresponding to 90° phase, is input to the light emitter driving circuit 32.

Similarly, the modulation signal 120 MHz−7.5 MHz is input to the light emitter driving circuit 32. Further, another modulation signal 120 MHz−7.5 MHz, which is shifted by a phase shifter 43b by the time (T/4) corresponding to 900 phase, is input to the light emitter driving circuit 32. The phase shifters 43a and 43b are equivalent to the phase shifter 5 as described above.

The light emitter driving circuit 32 makes the light emitter 21 burst-emit (intermittent-emit) according to the modulation signal 120 MHz+7.5 MHz and the modulation signal 120 MHz+7.5 MHz, which is shifted by the time of 90° phase. For instance, as shown in FIG. 6A, a cycle of the burst light emission is 10 μs (100 kHz), and a burst light emission time is 933.33 ns.

Further, a light emission driving signal, as emitted from the light emitter driving circuit 32, is the modulation signal 120 MHz+7.5 MHz and the modulation signal 120 MHz+7.5 MHz, which is shifted by the time of 90° phase.

Similarly, the light emitter driving circuit 32 makes the light emitter 21 burst-emit (intermittent-emit) according to the modulation signal 120 MHz−7.5 MHz and the modulation signal 120 MHz−7.5 MHz, which is shifted by the time of 900 phase.

Figure 6A:
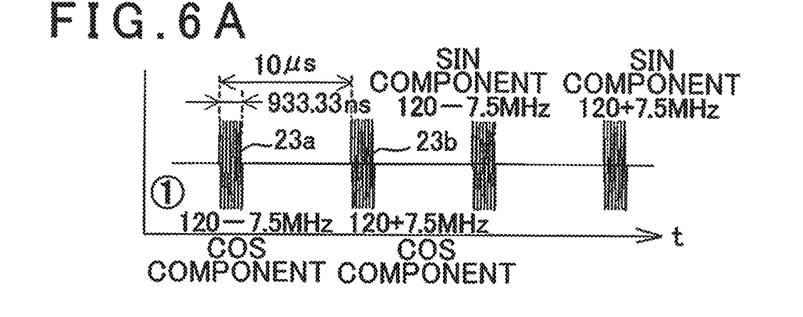
FIG. 6A is an explanatory drawing to show a distance measuring light emitted from a light emitter in the distance measuring component.

Further, the light emitter driving circuit 32 makes the light emitter 21 alternately emit by a time division according to the modulation signal 120 MHz−7.5 MHz (cosine component) and the modulation signal 120 MHz−7.5 MHz (sine component) which is shifted by the time of 90° phase, and according to the modulation signal 120 MHz+7.5 MHz (cosine component) and the modulation signal 120 MHz+7.5 MHz (sine component) which is shifted by the time of 90° phase (see FIG. 6A).

With respect to the modulation signal 120 MHz−7.5 MHz and the modulation signal 120 MHz+7.5 MHz shown first in FIG. 6A, the modulation signal 120 MHz−7.5 MHz and the modulation signal 120 MHz+7.5 MHz emitted behind are modulation signals, which are shifted by the time of 900 phase, respectively.

Therefore, from the light emitter 21, a distance measuring light 23a which is modulated to 120 MHz−7.5 MHz and 120 MHz−7.5 MHz shifted by the time of 90° phase and a distance measuring light 23b which is modulated to 120 MHz+7.5 MHz and 120 MHz+7.5 MHz shifted by the time of 900 phase are alternately burst-emitted in the burst emission cycle (10 μs) by the time division.

The reference signal generating module 40, the modulated frequency generating module 42a, 42b, the phase shifters 43a and 43b and the like make up a modulation signal generating module 45.

Further, the arithmetic control module 37 executes various programs stored in a memory module 38, performs a control of the light emitter driving circuit 32, a control of the light emitting state of the light emitter 21, a control of the driving circuit 36 and the like and further, executes required calculations required for a distance measurement.

It is to be noted that, as the memory module 38, an HDD, a semiconductor memory, a memory card, or the like is used.

The memory module 38 stores programs required for the control and various programs for calculations required for a measurement. These programs include, for instance, a signal processing program for executing the signal processing such as an amplification, an A/D conversion and the like of a signal as output from the photodetection circuit 33, a calculation program for executing a discrete Fourier transform (DFT) to the burst signal, a program for converting a result of the DFT to the phase and the amplitude, a calculation program for extracting a phase and an amplitude of a primary frequency, a secondary frequency . . . (to be described later) as obtained by executing the DFT and other programs.

Further, the memory module 38 stores various data such as distance measuring results, calculation results and the like.

A main control module 39 controls a distance measuring operation of the electronic distance meter (not shown) and controls a calculation processing of the arithmetic control module 37. The main control module 39 and the arithmetic control module 37 may be integrated as a control module. It is to be noted that, as the main control module 39, a CPU, a PC, or the like may be used.

Since the signal processing with respect to the distance measuring light 23 and the signal processing with respect to the internal reference light 24 are the same, a description will be given below on the distance measuring light 23.

Reflected distance measuring lights 23a' and 23b' enter the photodetector 27, intermittent photodetection signals 41a and 41b (see FIG. 6B) are alternately emitted from the photodetector 27, and the intermittent photodetection signals 41a and 41b correspond to the distance measuring lights 23a and 23b.

Figure 6B:
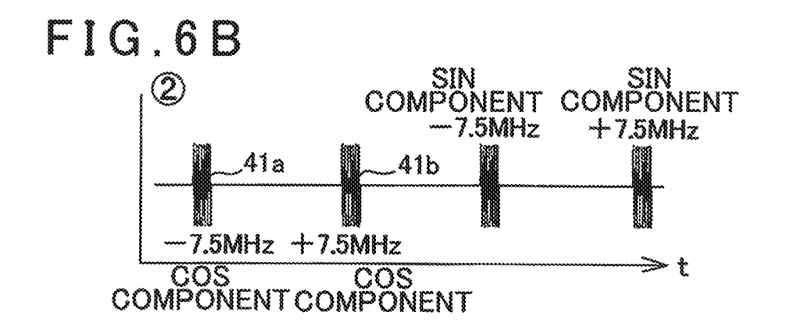
FIG. 6B is an explanatory drawing to show an intermittent photodetection signal emitted from a photodetector in the distance measuring component.

The intermittent photodetection signal 41a is a photodetection signal which has a signal width of 933.33 ns and includes 120 MHz−7.5 MHz and 120 MHz−7.5 MHz shifted by a time of π/2 (90°) phase. Similarly, the intermittent photodetection signal 41b is a photodetection signal which has a signal width of 933.33 ns and includes 120 MHz+7.5 MHz and 120 MHz+7.5 MHz shifted by a time of π/2 phase.

As described above, a light emission cycle of the light emitter 21 is 10 μs (100 kHz). Therefore, generation cycles (generation intervals) of both of the intermittent photodetection signals 41a and 41b are 10 μs. It is to be noted that a light emission interval of the light emitter 21 is set sufficiently longer than a time while the distance measuring light travels to and from the object to be measured and is adequately set corresponding to a maximum measuring distance as required.

The intermittent photodetection signals 41a and 41b are mixed with a reference signal of 120 MHz in mixing circuits 46a and 46b, respectively, and are beat down to intermittent modulation signals of +7.5 MHz and −7.5 MHz (see FIG. 6B).

The intermittent modulation signal beat down to −7.5 MHz is amplified by an amplifier 44a, and the intermittent modulation signal of +7.5 MHz is amplified by an amplifier 44b. The intermittent modulation signal, which is shifted by the time of 90° phase in the intermittent modulation signals of ±7.5 MHz output from the amplifiers 44a and 44b, is subjected to the signal processing (restoration processing) for advancing, by the time of 90° phase, the deviation intermittent photodetection signal s7, which is delayed by the time of 90° phase by shift restoration modules 45a and 45b (see the shift restoration module 12 as described above).

Since the restoration processing is executed regarding the intermittent modulation signals of ±7.5 MHz shifted by the time of 90° phase, ±7.5 MHz with a phase different from ±7.5 MHz are input to the photodetection circuit 33 without the time delay.

The intermittent modulation signal is subjected to the signal processing as required such as the A/D conversion and the like in the photodetection circuit 33 and is input to the arithmetic control module 37.

Further, an internal reference light which includes 120 MHz+7.5 MHz and 120 MHz+7.5 MHz shifted by the time of 90° phase and an internal reference light which includes 120 MHz−7.5 MHz and 120 MHz−7.5 MHz shifted by the time of 90° phase enter the photodetector 27 by the time division, and the photodetection signal as produced by the photodetector 27 is also subjected to a processing similar to the distance measuring light 23.

The light emitter driving circuit 32, the reference signal generating module 40, the modulated frequency generating modules 42a, 42b, the phase shifters 43a, 43b and the like make up a light emission driving signal generating module 47. Further, an amplifier 49, the mixing circuits 46a, 46b, the amplifiers 44a, 44b, the phase shifters 43a, 43b, the shift restoration modules 45a, 45b, the photodetection circuit 33 and the like make up a photodetection signal processing module 48.

Figures 7A, 7B, 7C:
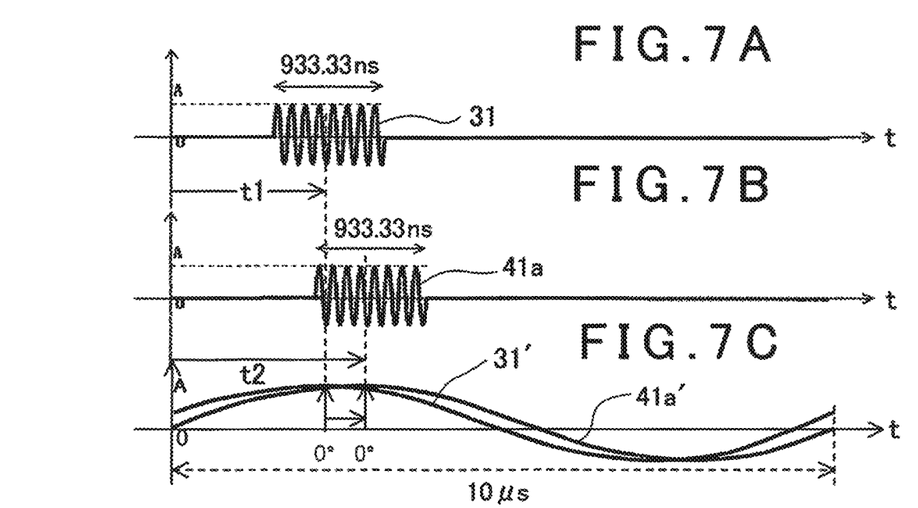
FIG. 7A is a drawing to show an intermittent photodetection signal of an internal reference light.
FIG. 7B is a drawing to show an intermittent photodetection signal of the distance measuring light.
FIG. 7C is a drawing to show a primary frequency extracted from respective intermittent photodetection signals.

Regarding the internal reference light, an optical path length is constant, and in a state where the circuits such as the photodetection circuit 33 and the like are stable, a generation timing of the light emission driving signal and a generation timing of the photodetection signal which the photodetection circuit 33 produces when receiving the internal reference light are fixed. Therefore, in a state where the circuits such as the photodetection circuit 33 and the like are stable, a relationship between the generation timing of the intermittent photodetection signal 31 (see FIG. 7) which the photodetection circuit 33 produces when receiving the internal reference light and the generation timing of the light emission driving signal is also fixed, and the photodetection signal of the internal reference light as produced by the photodetection circuit 33 becomes a signal based on the light emission driving signal.

Thus, the light emission driving signal generated by the light emitter driving circuit 32 may be used as a signal for reference.

FIG. 7A shows the intermittent photodetection signal 31 of the internal reference light 24 in a case where the light emitter 21 is burst-emitted in 10 μs for one cycle. FIG. 7B shows the intermittent photodetection signal 41a of the distance measuring light 23. FIG. 7C shows primary frequencies (10 μs for one cycle) 41a' and 31' extracted from the intermittent photodetection signal 41a and the intermittent photodetection signal 31 by the calculation processing of the DFT and a processing of a sideband.

It is to be noted that in FIG. 7A, FIG. 7B and FIG. 7C, the intermittent photodetection signals of modulation frequencies of 120 MHz+7.5 MHz of the distance measuring light 23 (23a, 23b) and the internal reference light 24 are omitted. Further, a description will be given below on a case where the light emitter 21 is burst-emitted only by 120 MHz−7.5 MHz by omitting 120 MHz−7.5 MHz, which is shifted by 90° phase.

Assuming that an intermittent light is a pulsed beam, and regarding the intermittent photodetection signal 31, assuming that t1 is a time difference from a light emitting timing of the distance measuring light 23 to a time of when the intermittent photodetection signal 31 of the internal reference light 24 is emitted, and t2 is a time difference from the light emitting timing of the distance measuring light 23 to a time of when the intermittent photodetection signal 41a of the distance measuring light 23 is emitted, and hence t2−t1=Δt is a time of when the distance measuring light 23 travels to and from the object to be measured, and a distance to the object to be measured can be measured by the light velocity and Δt. However, a monopulsed beam differs from a single pulsed beam, and since the intermittent light includes a modulated light of 120 MHz±7.5 MHz, a shape of the modulated light as received (modulation signal as emitted) changes according to a distance. Therefore, a dispersion occurs at a sampling position with respect to the modulated light, and as a result, a time difference Δt contains an error, and a measurement accuracy decreases. Therefore, actually, the distance measurement is performed based on a phase difference between the photodetection signal of the reflected distance measuring light and the photodetection signal of the internal reference light.

However, as described above, since the photodetection signal of the reflected distance measuring light and the photodetection signal of the internal reference light are both intermittent lights, it is impossible to obtain the phase difference between the photodetection signal of the reflected distance measuring light and the photodetection signal of the internal reference light. Therefore, although a phase is obtained when an entire burst period is set to a burst cycle (frequency 100 kHz) 2π, if the frequency conversion is performed, an amplitude of a spectrum appearing at 100 kHz (10 μs) becomes small.

For instance, in a case where a burst waveform (a period in FIG. 6A (burst cycle 10 μs)) is discrete-Fourier-transformed (DFT), a frequency and an amplitude with respect to the frequency are obtained. A spectrum 50 is obtained based on the frequency and the amplitude of the photodetection signal as obtained by the calculation processing of the DFT as shown in FIG. 8.

Figure 8:
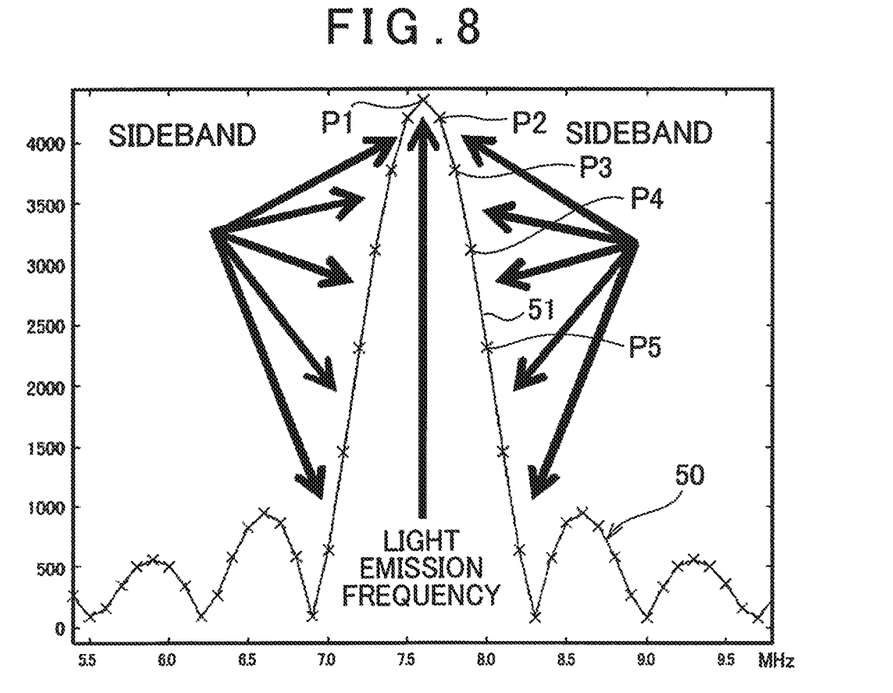
FIG. 8 is a graph for a phase and a frequency obtained by a DFT arithmetic processing, particularly a graph enlarging a neighborhood of a light emitting frequency.

Plots on the spectrum 50 in FIG. 8 are made to correspond to the burst emission cycle around a central frequency 7.5 MHz and plotted in terms of 100 kHz.

It is to be noted that FIG. 8 is a graph enlarging a neighborhood, particularly a light emission frequency (7.5 MHz). As shown in the figure, a large amplitude is obtained in the neighborhood around the light emission frequency (7.5 MHz) (hereinafter referred as a sideband 51), but when deviating from the central frequency (7.5 MHz), the amplitude rapidly becomes smaller, and there is little amplitude at 100 kHz (primary frequency) which is a light emission cycle.

This is because the light emission driving signal, as emitted from the light emitter driving circuit 32, is a clean sine wave, a signal contained in the burst period (period where a signal exists) is also a clean sine wave and both sine waves are cancelled, and hence an effective amplitude does not appear in the primary frequency.

On the other hand, the inventors focus on the fact that the sideband 51 with a large amplitude appears before and after the light emission frequency (7.5 MHz) of the central frequency, and find to use the sideband 51 with respect to this central frequency, to obtain a phase and an amplitude of the sideband with respect to the central frequency, and further to obtain phases of the primary to quartic wavelengths.

It is to be noted that the primary frequency is a frequency with a cycle of the burst light emission at 2π and is a frequency going around one cycle by an exact length of data subjected to the DFT.

If there are frequencies in an entire range to be subjected to DET, a peak ideally stands only in the light emission frequency and frequencies before and after the peak become zero. However, if the burst waveform (see FIG. 7A and FIG. 7B) is subjected to the DFT regarding the burst cycle, since only a part of the entire range exists waveforms, an amplitude, as related to a frequency difference from the light emission frequency, appears.

Since an amplitude of the sideband 51 also becomes a relational equation of a deviation of the frequency from the light emission frequency (7.5 MHz), a phase of a frequency difference can be obtained from this relational equation. Since a frequency interval required by the DFT is equal over the entire range (that is, the frequency interval is the burst light emission frequency), regarding a light emission frequency P1 and sideband frequencies P2 to P5 which are contained in the sideband 51, a frequency difference between the light emission frequency P1 and the sideband frequency P2 which is the closest to the light emission frequency P1 becomes a primary frequency, and a difference between the light emission frequency P1 and the sideband frequency P3 which is the second closest to the light emission frequency P1 becomes a secondary frequency. Similarly, a difference between the light emission frequency P1 and the sideband frequency P4 which is the third closest to the light emission frequency P1 becomes a tertiary frequency, and a difference between the light emission frequency P1 and the sideband frequency P5 which is the fourth closest to the light emission frequency P1 becomes a quartic frequency. As a result, a phase of a lower-order (primary to quartic, for instance) frequency can be obtained (see FIG. 7C).

By obtaining this primary frequency, a long distance measurement can be performed. Further, by obtaining the secondary frequency, the tertiary frequency and the quartic frequency, the distance measurement with high accuracy can be performed regarding a medium distance and a near distance.

Figure 9:
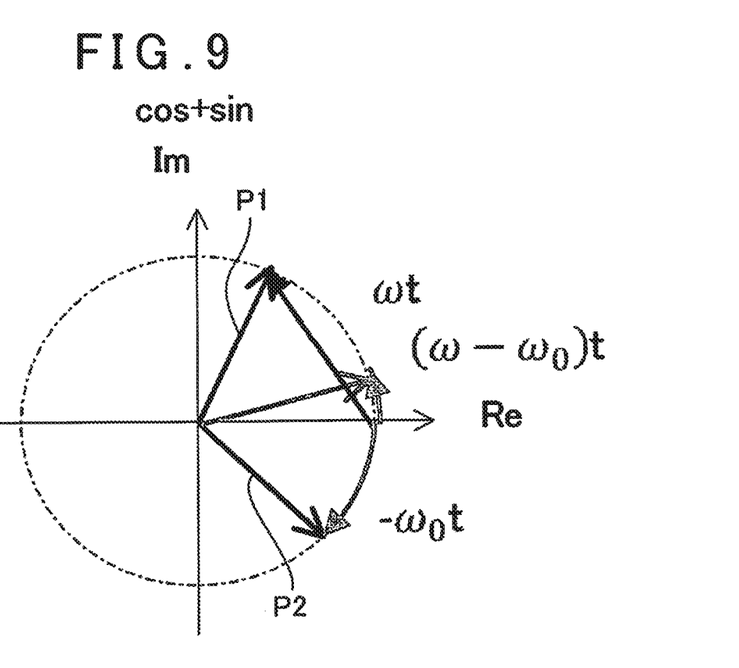
FIG. 9 shows phases of frequencies at two points adjacent regarding frequencies included in sidebands and shows a calculation of the DFT of the sideband on a single center circle.

FIG. 9 shows phases of the frequencies P1 and P2 at adjacent two points regarding the frequencies as contained in the sideband 51 and shows the calculation of the DFT of the sideband 51 on a single center circle.

In FIG. 9, it is assumed that wt is an angular speed of the light emission frequency (7.5 MHz, P1 in FIG. 8), and $\omega_0 t$ is an angular speed of the frequency of the sideband 51 (P2 in FIG. 8).

From an angular speed difference between the light emission frequency and the sideband, a phase rotates by an angular speed difference $((\omega-\omega_0)t)$ with respect to the phase of the light emission frequency.

Since ω and $\omega_0$ exist at a discrete interval of the DFT, a phase $((\omega-\omega_0)t)$, which is obtained based on a difference between adjacent frequencies, becomes equal to a phase of the primary frequency of the DFT. Therefore, by obtaining the difference between the adjacent frequencies, the phase of the primary frequency can be obtained.

With respect to the intermittent photodetection signal of the internal reference light, the DFT is executed, and the phase of the primary frequency can be also obtained by using the sideband. A phase of the primary frequency of the internal reference light is a phase of a primary frequency for reference in order to obtain a phase difference between the internal reference light and the distance measuring light. According to the phase of the primary frequency for reference and the phase of the primary frequency, which is obtained from the sideband of the intermittent photodetection signal of the distance measuring light, the phase difference between the internal reference light and the distance measuring light is obtained and a measured distance is calculated.

Figure 10:
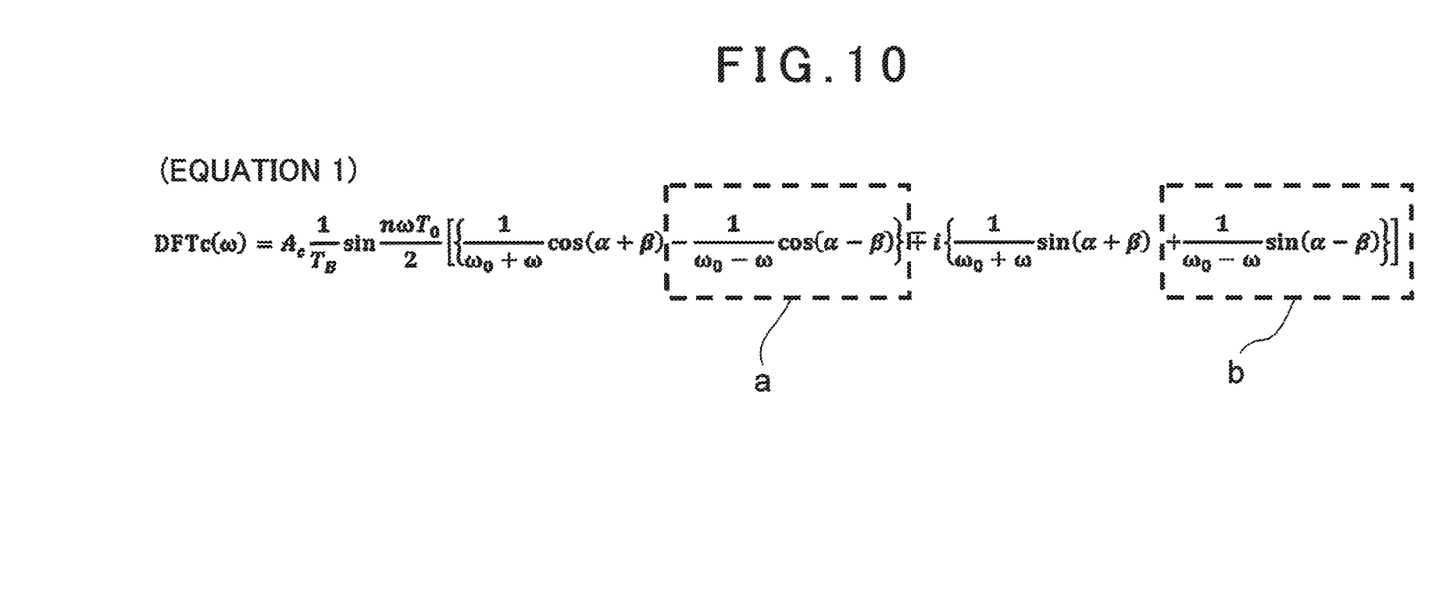
FIG. 10 shows an arithmetic equation in a case of a discrete Fourier transform (DFT) of a burst waveform.

FIG. 10 shows an arithmetic equation (1) for executing a DFT calculation processing regarding the burst cycle.

Figure 11:
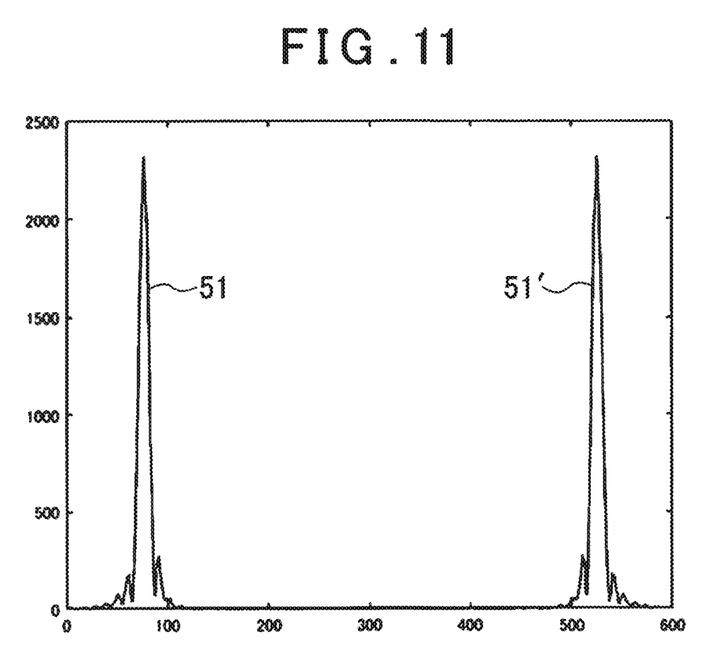
FIG. 11 is a graph to show a result of an amplitude in a case of the discrete Fourier transform of a burst period.

A result of the calculation processing based on an equation (1) is shown in FIG. 11.

By the DFT calculation processing, the sideband 51 is obtained, and an alias component 51' with the same waveform is also obtained at the same time. This alias component 51' corresponds to a term a and a term b in the equation (1).

By using whichever of the sideband 51 and the alias component 51' is used, the primary frequencies 41a' and 31' can be obtained. However, since the sideband 51 and the alias component 51' influence each other, in order to improve an accuracy, it is preferable that either one of the sideband 51 and the alias component 51' is deleted. A description will be given below on a case where the alias component 51' is to be removed.

As shown in the equation (1), the term a and the term b depend on cosine and sine, respectively. Therefore, with respect to the burst signal to be subjected to the calculation processing by the equation (1), a burst signal with the phase shifted by π/2 (90°) is subjected to the calculation processing by the equation (1), a result obtained by the calculation processing is subjected to an addition processing, and the term a and the term b can be removed.

In the present invention, based on an attention as described above, the burst signal with the phase shifted by π/2 (90°) is produced. That is, 120 MHz±7.5 MHz, which is shifted by the time of the 90° phase, is generated by the phase shifters 43a and 43b, and the light emitter 21 is driven and emitted by a modulation signal combining this 120 MHz±7.5 MHz, which is shifted by 90° phase, and 120 MHz±7.5 MHz.

The reflected distance measuring light 23' reflected by the object to be measured is received by the photodetector 27. The intermittent photodetection signal produced from the photodetector 27 is beat down by the mixing circuits 46a and 46b and further is IQ-demodulated by a signal from the phase shifter 43.

Figure 12:
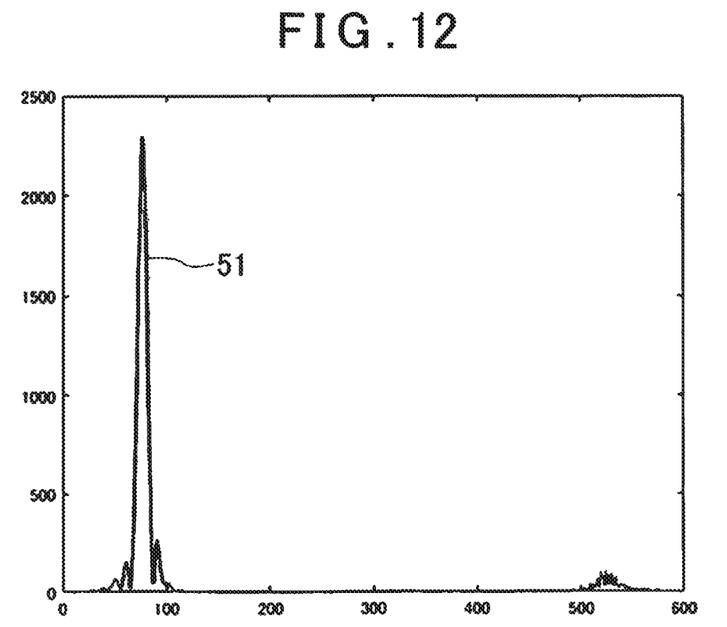
FIG. 12 is a graph to show a state where the present invention is put into practice and an unnecessary alias component is removed.

A photodetection signal as beat down is separated to the intermittent photodetection signal of +7.5 MHz and the intermittent photodetection signal of +7.5 MHz, which is shifted by the time of 90° phase. Further, the signal processing (restoration processing) for advancing, by π/2, the deviation intermittent photodetection signal s7, which is delayed by the time of π/2 by the shift restoration modules 45a and 45b, and the intermittent photodetection signal of −7.5 MHz and the intermittent photodetection signal of −7.5 MHz with the phase different by 90° are subjected to the DFT calculation processing. Further, by combining the results obtained by the DFT calculation processing, the alias component 51' is removed. FIG. 12 shows a state where the alias component 51' is removed.

In the embodiment as described above, although the present invention is applied to remove the alias component 51' in a case where the DFT calculation processing is carried out in the burst light emission method, additionally, an error in the same phase can be also removed by creating a signal with a phase inverted with respect to the reference signal and by synthesizing the reference signal and the signals with an inverted phase.

The invention claimed is:

1. A phase difference frequency generating method comprising:
    cutting out a reference signal, which is a continuous signal with a predetermined frequency, in a predetermined time and at a predetermined time interval by a signal for intermitting and creating a first intermittent signal,
    shifting said signal for intermitting by a time corresponding to π/a (a=natural number) of a fundamental frequency of said reference signal,
    cutting out said reference signal in the predetermined time and at the predetermined time interval by said signal for intermitting as shifted and creating a second intermittent signal, and
    carrying out a restoration processing for restoring said second intermittent signal by a time as shifted.

2. A phase difference frequency generating method in an electronic distance meter comprising:
    cutting out a reference signal, which is a continuous signal with a predetermined frequency, in a predetermined time and at a predetermined time interval by a signal for intermitting and creating a first intermittent signal,
    shifting said signal for intermitting by a time corresponding to π/a (a=natural number) of a fundamental frequency of said reference signal,
    cutting out said reference signal in the predetermined time and at the predetermined time interval by said signal for intermitting as shifted and creating a second intermittent signal,
    making a light emitter emit based on said first intermittent signal and said second intermittent signal,
    emitting a first intermittent distance measuring light and a second intermittent distance measuring light and receiving a reflected distance measuring light from an object to be measured by a photodetector, and
    carrying out a restoration processing for restoring, by a time as shifted, a second photodetection intermittent signal in a first intermittent photodetection signal and said second intermittent photodetection signal emitted from said photodetector.

3. A phase difference frequency generating device comprising:
    a reference signal generating module for generating a reference signal, which is a continuous signal with a predetermined frequency, a signal for intermitting generating module for generating a signal for intermitting, a phase shifter for generating an intermittent signal which is acquired by shifting said signal for intermitting by a time corresponding to π/a (a=natural number) of a fundamental frequency of said reference signal, and a shift restoration module for carrying out a restoration processing of restoring a second intermittent signal, which is shifted by the time of π/a, by a time as shifted.

4. An electronic distance meter comprising:
    a distance measuring light projecting module having a light emitter and for driving said light emitter and emitting a distance measuring light, a photodetection signal generating module having a photodetector for receiving a reflected light from an object to be measured and producing a photodetection signal, and an arithmetic control module for calculating a distance to the object to be measured based on said photodetection signal, wherein said distance measuring light projecting module includes a reference signal generating module for generating a reference signal, which is a continuous signal with a predetermined frequency, signal for intermitting generating modules for creating a signal for intermitting which cuts out said reference signal, which is the continuous signal with the predetermined frequency, in a predetermined time and at a predetermined time interval and creates an intermittent signal, phase shifters for shifting said signal for intermitting by a time corresponding to $\pi/a$ (a=natural number) of a fundamental frequency of said reference signal, and a light emission driving module for driving said light emitter based on said signal for intermitting and said signal for intermitting as shifted and emitting an intermittent distance measuring light and an intermittent distance measuring light as shifted, and wherein said photodetection signal generating module has a shift restoration module for carrying out a restoration processing of restoring, by a time as shifted, an intermittent reflected distance measuring light as shifted in a signal of an intermittent reflected distance measuring light produced by said photodetector and a signal of said intermittent reflected distance measuring light as shifted.

* * * * *